United States Patent
Bhide et al.

(10) Patent No.: US 11,222,087 B2
(45) Date of Patent: Jan. 11, 2022

(54) DYNAMICALLY DEBIASING AN ONLINE JOB APPLICATION SYSTEM

(71) Applicant: International Business Machines Corporation, Armonk, NY (US)

(72) Inventors: Manish Bhide, SeriLingamaplly (IN); Seema Nagar, Bangalore (IN); Sameep Mehta, New Delhi (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 16/253,022

(22) Filed: Jan. 21, 2019

(65) Prior Publication Data

US 2020/0233910 A1 Jul. 23, 2020

(51) Int. Cl.
*G06F 16/9535* (2019.01)
*H04L 29/08* (2006.01)
*G06F 16/9538* (2019.01)
*G06F 40/40* (2020.01)

(52) U.S. Cl.
CPC ...... *G06F 16/9535* (2019.01); *G06F 16/9538* (2019.01); *G06F 40/40* (2020.01); *H04L 67/306* (2013.01)

(58) Field of Classification Search
CPC .. G06F 16/9535; G06F 16/9538; G06F 40/40; H04L 67/306
USPC .......................................................... 707/733
See application file for complete search history.

(56) References Cited

U.S. PATENT DOCUMENTS

| | | | |
|---|---|---|---|
| 8,930,398 B1 * | 1/2015 | Kishore | G06F 16/9024 707/780 |
| 9,652,745 B2 | 5/2017 | Taylor et al. | |
| 10,242,260 B1 * | 3/2019 | Shen | G06N 20/10 |
| 10,467,339 B1 * | 11/2019 | Shen | G06F 40/242 |
| 10,839,153 B2 * | 11/2020 | Gaur | G06F 40/253 |
| 11,030,583 B1 * | 6/2021 | Garg | G06N 20/00 |
| 2010/0293126 A1 * | 11/2010 | Lang | G06Q 10/00 706/46 |

(Continued)

OTHER PUBLICATIONS

"So What Exactly us a Blind Audition?;" GapJumpers; Jul. 28, 2015; accessed: https://medium.eom/@gapjumpers/so-what-exactly-is-a-blind-audition-26333ddf76a7.*

(Continued)

*Primary Examiner* — Giovanna B Colan
(74) *Attorney, Agent, or Firm* — Kunzler Bean & Adamson; Bruce R. Needham

(57) ABSTRACT

An apparatus for dynamically debiasing an online job application system includes a processor and a memory that stores code executable by the processor to receive a plurality of job listings and corresponding job descriptions in response to a search query on an online job listing system and to dynamically modify bias terms of the job description for each of the job listings based on profile information for a user such that each of the job descriptions conforms to the user's profile information. The apparatus includes code executable by the processor to dynamically rank each of the job listings based on the modified job descriptions and with respect to the user's profile information and the search query and to present the job listings and their corresponding modified job descriptions in order of the rank for each of the job listings.

20 Claims, 6 Drawing Sheets

(56) References Cited

U.S. PATENT DOCUMENTS

| | | | |
|---|---|---|---|
| 2012/0095933 A1 | 4/2012 | Goldberg | |
| 2013/0290208 A1 | 10/2013 | Bonmassar et al. | |
| 2014/0344271 A1* | 11/2014 | Bartram | G06F 16/285 707/737 |
| 2016/0055457 A1* | 2/2016 | Mather | G06Q 10/1053 705/321 |
| 2017/0154313 A1* | 6/2017 | Duerr | G06F 16/248 |

OTHER PUBLICATIONS

"Is Blind Hiring the Best Hiring;" Feb. 25, 2016; Claire Miller; The New York Times Magazine; accessed: https://www.nytimes.com/2016/02/28/magazine/is-blind-hiring-the-best-hiring.html.*

"Guidelines for Gender Neutral Recruitment," Government of South Australia, Office for Women, Jun. 2007.*

"Guidelines for Gender Neutral Recruitment," Government of South Australia, Office for Women, Jun. 2007, (https://www.officeforwomen.sa.gov.au/data/assets/pdf_file/0016/48112/DCSI-929-OFW-Gender-Neutral-Bklet_Update_JUNE17_V2.2.pdf (last visited Jan. 21, 2019).

Anderson, David, "Blind Recruitment: Remove Bias From Your Hiring Process," https://recruiterbox.com/blog/blind-recruitment-remove-bias-from-your-hiring-process (last visited Jan. 21, 2019).

Döbrich, C., Wollersheim, J., Welpe, I.M. and Spörrle, M., 2014. Debiasing age discrimination in HR decisions. International Journal of Human Resources Development and Management, 14(4), pp. 219-241.

Hareli, S., Klang, M. and Hess, U., 2008. The role of career history in gender based biases in job selection decisions. Career Development International, 13(3), pp. 252-269.

Engstrom, Erin, "6 Ways to Remove Hiring Bias from the Recruitment Process," https://recruiterbox.com/blog/remove-hiring-bias-from-recruitment-process (last visited Jan. 21, 2019).

Knight, Rebecca, "7 Practical Ways to Reduce Bias in Your Hiring Process," Harvard Business Review, Jun. 12, 2017, https://hbr.org/2017/06/7-practical-ways-to-reduce-bias-in-your-hiring-process (last visited Jan. 21, 2019).

"Can You Spot The Gender Bias In This Job Description?", https://www.catalyst.org/zing/can-you-spot-gender-bias-job-description (last visited Jan. 21, 2019).

* cited by examiner

DYNAMICALLY DEBIASING AN ONLINE JOB APPLICATION SYSTEM

BACKGROUND

The subject matter disclosed herein relates to online job application systems and more particularly relates to removing biases from an online job application system.

SUMMARY

An apparatus for dynamically debiasing an online job application system is disclosed. A computer-implemented method and computer program product also perform the functions of the apparatus. According to an embodiment of the present invention, an apparatus includes a processor and a memory that stores code executable by the processor to receive a plurality of job listings in response to a search query on an online job listing system. Each of the plurality of job listings may include a job description. The apparatus includes code executable by the processor to dynamically modify one or more bias terms of the job description for each of the plurality of job listings based on profile information for a user such that each of the job descriptions conforms to the user's profile information. The apparatus includes code executable by the processor to dynamically rank each of the plurality of job listings based on the modified job descriptions and with respect to the user's profile information and the search query. The apparatus includes code executable by the processor to present the plurality of job listings and their corresponding modified job descriptions in order of the rank for each of the plurality of job listings.

A method for dynamically debiasing an online job application system is disclosed. In one embodiment, a method includes receiving a plurality of job listings in response to a search query on an online job listing system. Each of the plurality of job listings may include a job description. The method, in some embodiments, includes dynamically modifying one or more bias terms of the job description for each of the plurality of job listings based on profile information for a user such that each of the job descriptions conforms to the user's profile information. The method, in further embodiments, includes dynamically ranking each of the plurality of job listings based on the modified job descriptions and with respect to the user's profile information and the search query. The method, in one embodiment, includes presenting the plurality of job listings and their corresponding modified job descriptions in order of the rank for each of the plurality of job listings.

A computer program product for dynamically debiasing an online job application system is disclosed. In one embodiment, the computer program product includes a computer readable storage medium having program instructions embodied therewith. The program instructions, in one embodiment, are executable by a processor to cause the processor to receive a plurality of job listings in response to a search query on an online job listing system. Each of the plurality of job listings may include a job description. The program instructions, in some embodiments, are executable by a processor to cause the processor to dynamically modify one or more bias terms of the job description for each of the plurality of job listings based on profile information for a user such that each of the job descriptions conforms to the user's profile information. The program instructions, in certain embodiments, are executable by a processor to cause the processor to dynamically rank each of the plurality of job listings based on the modified job descriptions and with respect to the user's profile information and the search query. The program instructions, in further embodiments, are executable by a processor to cause the processor to present the plurality of job listings and their corresponding modified job descriptions in order of the rank for each of the plurality of job listings.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
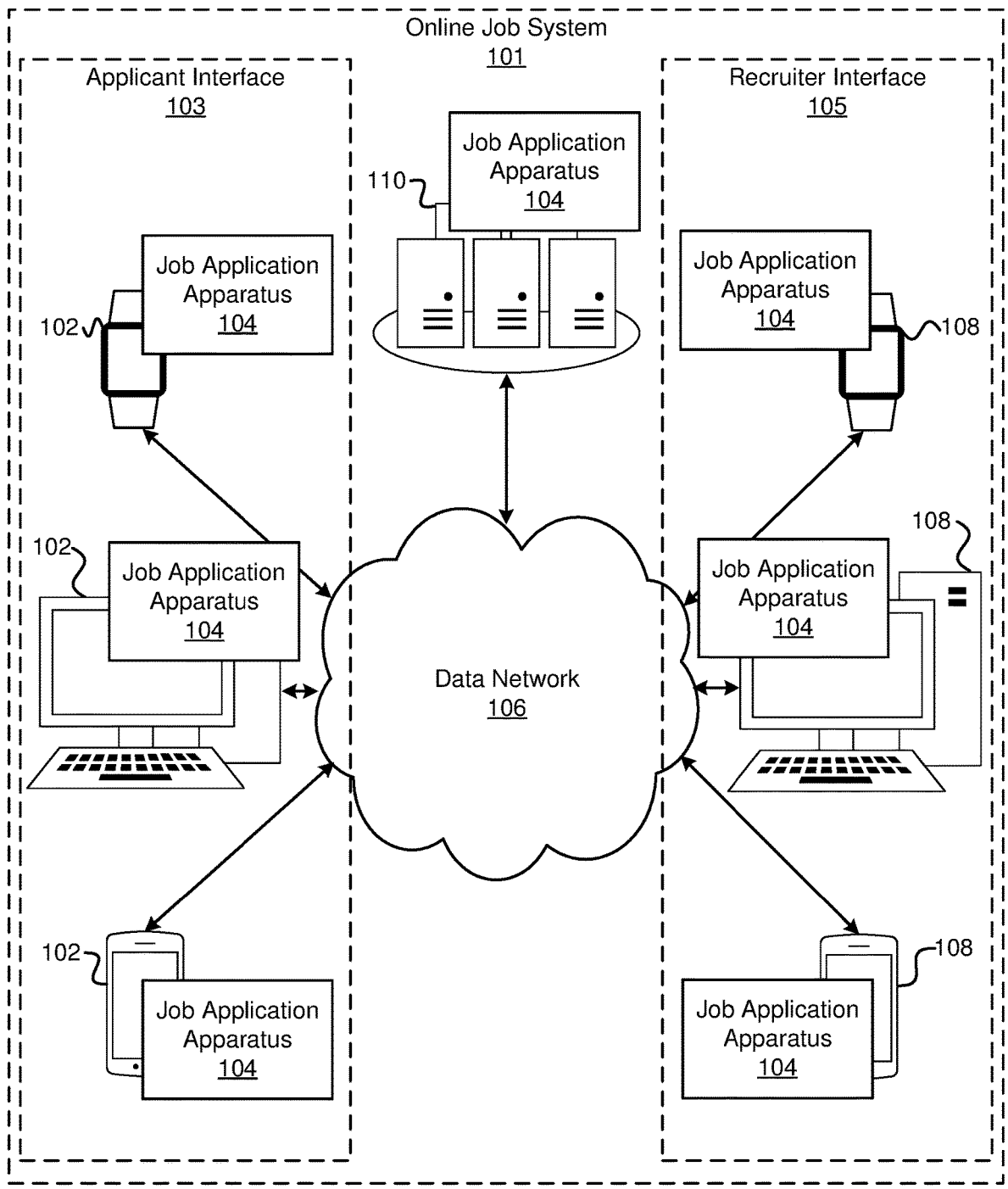
FIG. 1 is a schematic block diagram illustrating one embodiment of a system for dynamically debiasing an online job application system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The description of elements in each figure may refer to elements of proceeding figures. Like numbers refer to like elements in all figures, including alternate embodiments of like elements.

An apparatus for dynamically debiasing an online job application system is disclosed. In one embodiment, an apparatus includes a job receiving module that receives a plurality of job listings in response to a search query on an online job listing system. Each of the plurality of job listings may include a job description. The apparatus, in some embodiments, includes a job adapting module that dynamically modifies one or more bias terms of the job description for each of the plurality of job listings based on profile information for a user such that each of the job descriptions conforms to the user's profile information.

The apparatus, in further embodiments, includes a job ranking module that dynamically ranks each of the plurality of job listings based on the modified job descriptions and with respect to the user's profile information and the search query. The apparatus, in one embodiment, includes a job presentation module that presents the plurality of job listings and their corresponding modified job descriptions in order of the rank for each of the plurality of job listings. In one embodiment, at least a portion of the modules comprise one or more of hardware circuits, programmable hardware devices and a processor executing code.

In one embodiment, dynamically modifying the one or more bias terms of a job description includes removing bias terms, substituting different terms for the bias terms, and/or adding additional terms to the job description. In certain embodiments, the adapting module parses each of the job descriptions using natural language processing to identify and modify the bias terms for each of the job descriptions.

In one embodiment, the apparatus includes a term module that compares each term of the job description against terms in a resource map to identify the one or more bias terms. The resource map may include a plurality of predefined bias terms and their corresponding modifications. In various embodiments, the apparatus includes a profile adapting module that modifies one or more bias terms of the user's profile information based on a job description for a job listing that the user is submitting their profile information for such that the user's profile information conforms to the job description.

In one embodiment, the profile adapting module modifies the user's profile information in response to the user submitting their profile information to apply for the job listing. In certain embodiments, the profile adapting module modifies the user's profile information to conform to each job description of the plurality of job listings in response to receiving the plurality of job listings.

In one embodiment, the apparatus includes a confirmation module that receives input from the user for applying to a job listing using the user's profile information, presents to the user an unmodified version of the job description for the job listing and a modified version of the user's profile information that conforms to the unmodified version of the job description, prompts the user for confirmation to apply for the job listing using the modified version of the user's profile information, and submits the user's modified profile information to the online job listing system for the job listing in response to receiving confirmation from the user to apply for the job listing.

In one embodiment, the confirmation module further submits the user's unmodified profile information in response to receiving confirmation from the user to apply for the job listing. In some embodiments, the confirmation module presents an unmodified version of the job description for the job listing, the modified version of the job description for the job listing, an unmodified version of the user's profile information, and a modified version of the user's profile information as part of prompting the user for confirmation to apply for the job listing.

In one embodiment, the apparatus includes a profile receiving module that receives a plurality of modified user profiles at the online job listing system for a job listing that is presented to a plurality of users. In further embodiments, the apparatus includes a profile ranking module that ranks each of the plurality of modified user profiles. In certain embodiments, the apparatus includes a profile presentation module that presents each of the plurality of modified user profiles for the job listing to a user associated with the job listing, the plurality of modified user profiles presented in order of the rank for each of the modified user profiles.

In one embodiment, each of the plurality of modified user profiles are further modified according to one or more bias and style specifications defined by the user associated with the job listing. In some embodiments, the user's profile information includes one or more of a resume, a curriculum vitae, and an online profile for the user. In certain embodiments, the one or more bias terms includes terms associated with a class of people designated as protected by a government, the bias terms comprising terms related to one or more of sex, race, age, religion, ethnicity, and physical or mental disability.

A method for dynamically debiasing an online job application system is disclosed. In one embodiment, a method includes receiving a plurality of job listings in response to a search query on an online job listing system. Each of the plurality of job listings may include a job description. The method, in some embodiments, includes dynamically modifying one or more bias terms of the job description for each of the plurality of job listings based on profile information for a user such that each of the job descriptions conforms to the user's profile information. The method, in further embodiments, includes dynamically ranking each of the plurality of job listings based on the modified job descriptions and with respect to the user's profile information and the search query. The method, in one embodiment, includes presenting the plurality of job listings and their corresponding modified job descriptions in order of the rank for each of the plurality of job listings.

In one embodiment, dynamically modifying the bias terms of a job description includes removing bias terms, substituting different terms for the bias terms, and/or adding additional terms to the job description. In certain embodiments, the method includes parsing each of the job descriptions using natural language processing to identify and modify the bias terms for each of the job descriptions.

In various embodiments, the method includes comparing each term of the job description against terms in a resource map to identify the one or more bias terms. The resource map may include a plurality of predefined bias terms and their corresponding modifications. In further embodiments, the method includes modifying one or more bias terms of the user's profile information based on a job description for a job listing that the user is submitting their profile information for such that the user's profile information conforms to the job description.

A computer program product for dynamically debiasing an online job application system is disclosed. In one embodiment, the computer program product includes a computer readable storage medium having program instructions embodied therewith. The program instructions, in one embodiment, are executable by a processor to cause the processor to receive a plurality of job listings in response to a search query on an online job listing system. Each of the plurality of job listings may include a job description.

The program instructions, in some embodiments, are executable by a processor to cause the processor to dynamically modify one or more bias terms of the job description for each of the plurality of job listings based on profile information for a user such that each of the job descriptions conforms to the user's profile information. The program instructions, in certain embodiments, are executable by a processor to cause the processor to dynamically rank each of the plurality of job listings based on the modified job descriptions and with respect to the user's profile information and the search query. The program instructions, in further embodiments, are executable by a processor to cause the processor to present the plurality of job listings and their corresponding modified job descriptions in order of the rank for each of the plurality of job listings.

FIG. 1 is a schematic block diagram illustrating one embodiment of a system for dynamically debiasing an online job application system. In one embodiment, the system 100 includes an online job system 101 that may be embodied as a web application. The online job system 100 may be configured to store, manage, and present job listings that are generated using a recruiter interface 105 to applicants using the applicant interface 103. For instance, the online job system 101 may receive job search queries (e.g., keyword search queries) from an applicant using an application interface 103, run the search query against a plurality of job listings that the online job system 101 maintains, and present the relevant results of the search to the applicant.

Furthermore, employers or recruiters using the recruiter interface 105 of the online job system 101 may create and post job listings for different positions within a company, organization, agency, or the like. The job listings may include various information including a description of the job, requirements of the job, pay information, benefit information, and/or the like. The applicant interface 103 and the recruiter interface 105 may include a website, a plugin for a web browser, a mobile application, a desktop application, and/or the like.

The applicant interface 103, in one embodiment, includes one or more information handling devices 102 and one or more job application apparatuses 104, described below. In certain embodiments, even though a specific number of information handling devices 102 and job application apparatuses 104 for the applicant interface 103 are depicted in FIG. 1, one of skill in the art will recognize, in light of this disclosure, that any number of information handling devices 102 and job application apparatuses 104 may be included in the applicant interface 103.

Similarly, the recruiter interface 105, in one embodiment, includes one or more information handling devices 108 and one or more job application apparatuses 104, described below. In certain embodiments, even though a specific number of information handling devices 108 and job application apparatuses 104 for the recruiter interface 105 are depicted in FIG. 1, one of skill in the art will recognize, in light of this disclosure, that any number of information handling devices 108 and job application apparatuses 104 may be included in the recruiter interface 105.

The information handling devices 102, 108 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102, 108 are communicatively coupled to one or more other information handling devices 102, 108, data centers or servers 110, and/or the like over a data network 106, described below. The information handling devices 102, 108, in further embodiments, may include processors, processor cores, and/or the like that are configured to execute various programs, program code, applications, instructions, functions, and/or the like.

In one embodiment, the job application apparatus 104 is configured to receive a plurality of job listings in response to a search query entered and performed at the online job system 101, modify one or more job descriptions of the plurality of job listings to modify bias terms for the job descriptions based on a user profile, rank the job listings based on the modified job descriptions, and present the job listings in order of the rank. The job application apparatus 104, including its various sub-modules, may be located on one or more information handling devices 102, 108 in the system 101, one or more servers or data centers 110, one or more network devices on the data network 106, and/or the like. The job application apparatus 104 is described in more detail below with reference to FIGS. 2 and 3.

In one embodiment, the job application apparatus 104 improves upon conventional job application systems. For example, in conventional job application systems, the job listings and job descriptions may contain biased language that appeals to or deters certain applicants from applying for a job. The biased language may include language related to specific genders, ages, races, religions, or the like. On the other hand, the claimed solution dynamically modifies biased language from a job listing or job description, without changing the duties or requirements of the job, to attract diverse applicants from various backgrounds, experiences, or the like and encourage applicants who would be deterred from applying for a particular job due to the biased language in the job description to apply for the job. As described below, the claimed solution utilizes various technical features to achieve the claimed solution such as natural language processing, parsers, regular expressions, and/or other information extraction methodologies.

In various embodiments, the job application apparatus 104 may be embodied as a hardware appliance that can be installed or deployed on an information handling device 102, on a server 108, or elsewhere on the data network 106. In certain embodiments, the job application apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the job application apparatus 104 may include a power interface, a wired and/or wireless network interface, a graphical interface that attaches to a display, and/or a semiconductor integrated circuit device as described below, configured to perform the functions described herein with regard to the job application apparatus 104.

The job application apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the job application apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the job application apparatus 104.

The semiconductor integrated circuit device or other hardware appliance of the job application apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the job application apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The online job system 100 may further include servers 110. The servers 110 may embodied as blade servers, mainframe servers, tower servers, rack servers, and/or the like. The servers 110 may be configured as mail servers, web servers, application servers, FTP servers, media servers, data servers, web servers, file servers, virtual servers, and/or the like. The servers 110 may be communicatively coupled (e.g., networked) over a data network 106 to one or more information handling devices 102, 108 to receive search queries and serve job listing results based on the search query to devices 102 at the applicant interface 103 and/or to receive job listings and serve applicant profile information (e.g., resumes) to devices at the recruiter interface 105. The servers 110 may be part of a data center, and may include physical and/or virtual devices.

As described herein, the job application apparatus 104 may be located on user devices 102 at the applicant interface 103, may be located on user devices 108 at the recruiter interface, may be located on the servers 110 in the data center, and/or some combination of the foregoing. Thus, the servers 110 may process search requests, modifying job descriptions, rank job descriptions, store and manage job listings and/or user profile information, and/or the like, while the devices 102 at the applicant interface 103, for example, present the job listings that recruiters submit from the recruiter interface 105 and the devices 108 at the recruiter interface 105 present applicants' profile information received from the applicant interface 103 for a job listing.

Figure 2:
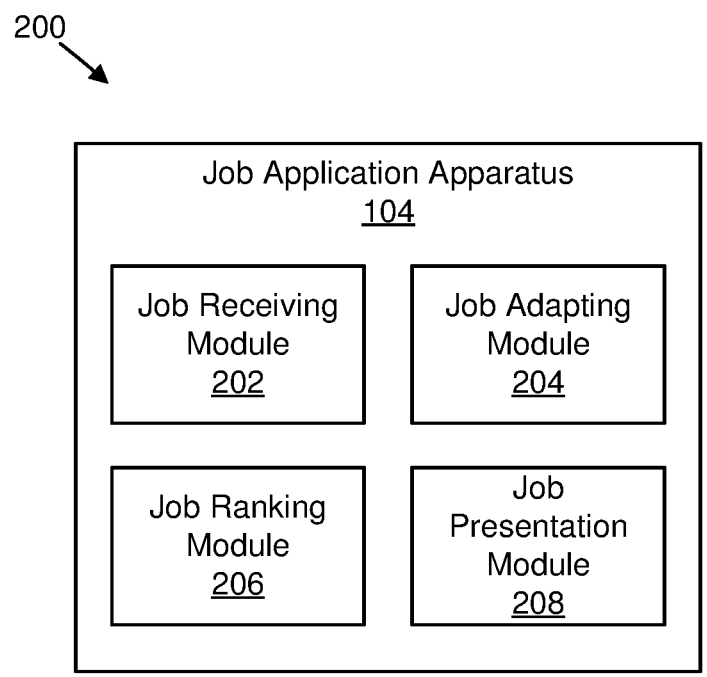
FIG. 2 is a schematic block diagram illustrating one embodiment of an apparatus for dynamically debiasing an online job application system.

FIG. 2 is a schematic block diagram illustrating one embodiment of an apparatus 200 for dynamically debiasing an online job application system. In one embodiment, the apparatus 200 includes an instance of a job application apparatus 104. The job application apparatus 104 includes a job receiving module 202, a job adapting module 204, a job ranking module 206, and a job presentation module 208, which are described in more detail below.

In one embodiment, the job receiving module 202 receives a plurality of job listings in response to a search query on an online job listing system. In certain embodiments, each of the plurality of job listings includes additional information about the job listing including a job description, an amount of pay for the job, available benefits associated with the job, and/or the like. In some embodiments, the job receiving module 202 receives the job listings from a remote server, e.g., a web server, over the data network 106.

For instance, the job receiving module 202 may submit the user's search query to the web server, e.g., using a hypertext transfer protocol ("HTTP"), and receive job listing results from the web server based on the search query. For example, if a user submits a search query that includes keywords such as "office assistant", the job receiving module 202 may submit the keywords "office assistant" to the web server, where an instance of the job receiving module 202 at the web server receives the keywords and searches a database, data store, list, or the like of job listing that match the criteria "office assistant". The job receiving module 202 at the web server may then send the matching results to the job receiving module 202 at the applicant interface 103. Other search criteria may be provided such as a location, a salary range, and other job requirements to further filter the job listing results.

The job listings that the job receiving module 202 receives at the applicant interface 103 may be formatted in a markup language such as hypertext markup language ("HTML"), extensible markup language ("XML"), and/or other structured language formats that one of skill in the art would recognize in light of this disclosure. In certain embodiments, the job receiving module 202 at the web server may provide a link, e.g., a hyperlink, file transfer protocol link, or the like to the job listing results at the web server that the job receiving module 202 at the applicant interface 103 can use to access the job listing results from the web server. In such an embodiment, the job receiving module 202 at the applicant interface 103 may provide an access key, token, or other credentials to access the job listing results from the web server.

The job adapting module 204, in one embodiment, dynamically modifies one or more bias terms of a job description for each of the plurality of job listings (that the job receiving module 202 receives) based on profile information for a user such that each of the job descriptions conforms to the user's profile information. As used herein, a bias term may include a language term, phrase, sentence, style, tone, or the like that is directed to specific genders, ages, races, religions, ethnicities, physical or mental disabilities, and/or other classes of people who may be designated as legally protected from discrimination by a government or other agency. For instance, bias terms in a job description, whether inserted intentionally or not, may deter applicants of certain genders, ages, races, or the like from applying for the job even though the applicants are otherwise qualified to perform the duties of the job.

The job adapting module 204, in one embodiment, identifies bias terms in the job description of the job listings by parsing the job descriptions using natural language processing, or other information extraction methods (e.g., regular expressions), to identify bias terms, bias style, bias tone, or the like in the job description. As used herein, natural language processing may refer to using artificial intelligence or other information processing techniques to process, analyze, and understand language data. For instance, the job adapting module 204 may mark, flag, or otherwise highlight bias terms in a job description and provide recommendations for modifying the bias terms to make the terms less biased or bias-free. In further embodiments, the job adapting module 204 may flag portions of a job description that includes bias style or tone and provide recommendations for revising the flagged portions to make the style or tone less biased or bias-free.

For example, the job adapting module 204 may markup the job description with tags (e.g., HTML tags, XML tags, or the like) to indicate portions of the job description that should be modified. For instance, there may be tags that indicate bias terms in the job description, that indicate portions of the job description that have a bias style or tone, and/or the like.

The job adapting module 204, in further embodiments, modifies the job description by removing bias terms, substituting different terms for the bias terms, adding additional terms or language, revising portions of the job description to have a different style or tone, and/or the like. For example, the job adapting module 204 may scan a marked up version of the job description to identify tags or other markers that indicate a bias term, or a portion of the job description written in a bias style or tone and may perform various actions based on the tag or marker such as remove terms, add terms, revise language, substitute terms, and/or the like to make the job description less biased or bias free. The identification of particular bias terms and/or styles is described in more detail below with reference to the term module 304.

The job adapting module 204, in certain embodiments, modifies the job description with respect to the user's profile information. As used herein, the user's profile information may include an uploaded resume, an uploaded curriculum vitae, an online user profile (e.g., a user profile uploaded or submitted to the online job listing system 101, a social media profile, and/or the like), and/or the like. The job adapting module 204, in some embodiments, parses the user's profile information for terms that may be related to the bias terms identified in the job description so that the job description can be modified to conform to, correspond to, or otherwise relate to the user's profile information.

For example, if the job adapting module 204 determines that the user is a female, based on the user's profile information, then the job adapting module 204 may remove terms from the job description that are known to be male-biased terms such as "competitive" or "challenging". Furthermore, if the job adapting module 204 determines from the user's profile information that the user has worked in a "multi-person" or "team" environment, the job adapting module 204 may substitute the term "cooperative" in the job description with the term "multi-person". In this manner, the job adapting module 204 can remove bias from the job description and conform the job description to fit the personality or style of the user without changing the requirements or duties of the advertised job, which may encourage the user to apply for a job that the user may otherwise not apply for.

The job ranking module 206, in one embodiment, dynamically ranks each of the plurality of job listings based on the modified job descriptions and with respect to the user's profile information and the search query. The job ranking module 206, for example, may rank the job listings according to the relevancy of the job descriptions for the job listings to the user's search query and/or to the user's profile information. The job ranking module 206 may use various ranking algorithms to determine the relevancy of the job listings to the user's search query and the user's profile information.

For instance, the job ranking module 206 may determine how relevant a job listing is based on the number of times the search keywords appear in the job description (or other job listing information), based on whether the information in the job description for the job listing matches the user's profile information (e.g., whether a description of the job duties matches the user's previous experience, whether a description of the education requirements matches the user's education, and/or the like).

The job ranking module 206 may assign points, weights, scores, or the like to job listings that include information that matches the search query and/or the user's profile information. In certain embodiments, the job ranking module 206 may assign different weights to different matching information. For instance, the job ranking module 206 may place more importance on keywords from the search query that match the job description, and therefore may assign more points to job listings that have job descriptions that include more keywords that match the search query than job descriptions of other job listings. Other factors may be weighted more heavily such as a user's education level, a matching desired salary level, matching work experience, or the like. The job ranking module 206 may receive input from a user to determine what factors the user finds important (e.g., as a pop-up survey question, or the like).

In one embodiment, the job presentation module 208 presents the plurality of job listings and their corresponding modified job descriptions in order of the rank for each of the plurality of job listings. The job presentation module 208, for example, may present the job listings in a web browser, mobile application, desktop application, or the like in the order that the job ranking module 206 determined for each job listing based on the weights, scores, points, or the like for the job listings.

In one embodiment, the job presentation module 208 may present the job listings with the modified job descriptions that the job adapting module 204 modified to remove the bias terms/style. In this manner, the user can read the unbiased job descriptions and select which job listings to apply for based on the unbiased job descriptions. In certain embodiments, the job presentation module 208 provides an indication that the job description has been modified and/or provides a way for the user to view the original/unmodified job description. For example, the job presentation module 208 may present an icon or other indication that signals to an applicant that the job description has been modified. The applicant may click on the icon or other interactive graphical element to display the original job description (e.g., in place of the modified job description, in a pop-up window, next to the modified job description, or the like), to switch or toggle between the original and the modified job descriptions, and/or the like.

Figure 3:
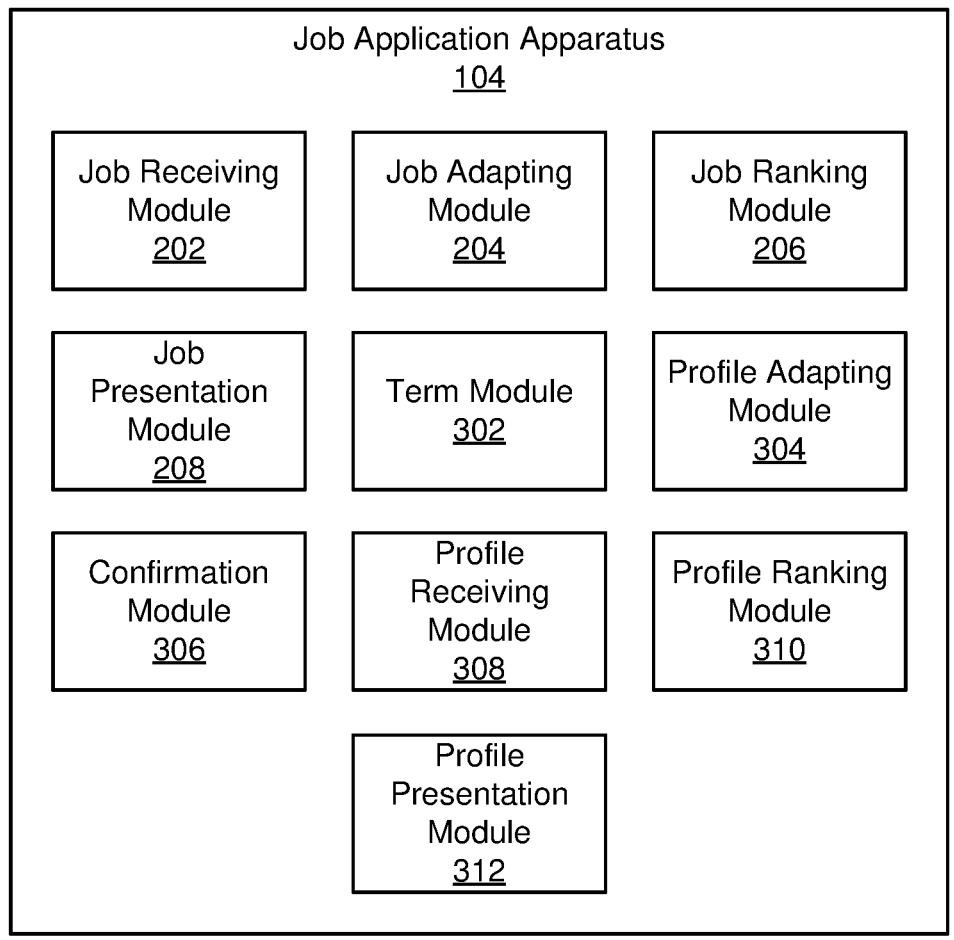
FIG. 3 is a schematic block diagram illustrating one embodiment of another apparatus for dynamically debiasing an online job application system.

FIG. 3 is a schematic block diagram illustrating one embodiment of another apparatus 300 for dynamically debiasing an online job application system. In one embodiment, the apparatus 300 includes an instance of a job application apparatus 104. The job application apparatus 104 includes a job receiving module 202, a job adapting module 204, a job ranking module 206, and a job presentation module 208, which may be substantially similar to the job receiving module 202, the job adapting module 204, the job ranking module 206, and the job presentation module 208 described above with reference to FIG. 2. In further embodiments, the job application apparatus 104 includes one or more of a term module 302, a profile adapting module 304, a confirmation module 306, a profile receiving module 208, a profile ranking module 310, and a profile presentation module 312, which are described in more detail below.

In one embodiment, the term module 302 compares each term of a job description, which the job adapting module 204 may identify using natural language processing, regular expressions, or the like, against terms in a resource map to identify one or more bias terms. The resource map may include a database, a data store, a list, or other indexable data structure that includes a source bias term and one or more corresponding unbiased or less-biased terms. For example, the resource map may include a bias term "source: <challenging>" with a corresponding target terms "target:<difficult>; target:<exciting>; target:<null>".

Furthermore, the source bias terms and the target less-biased or unbiased terms may include scores, values, weights, or the like that describe the "hardness" of the term. In other words, the terms may include an associated weight that describes a level of bias for the term. Continuing with the example above, the source term and the target terms may include bias weights such as "{source: <challenging, 80>; target:<difficult, 60>; target:<exciting, 30>; target:<null, 0>}". Thus, if the term "challenging" is found in a job description for a job listing, the job adapting module 204 may select a term from the resource map, as identified by the term module 302, to reduce the bias of the job description by substituting the term "challenging" with one of the corresponding terms that has a lower bias weight such as "difficult" or "exciting". Another option is to remove the term "challenging" from the job description as indicated by the "null" value in the term set, which has a bias value of 0 indicating no bias.

The term module 302 may assign the weights to the terms based on user input. For instance, the source and target terms, and their corresponding weights, may be predefined by a user when the resource map is generated. In other embodiments, the term module 302 may learn, over time, using machine learning or other artificial intelligence techniques, which terms are bias terms, which terms can be substitutes for bias terms, and different weights for the substitute terms. Furthermore, the term module 302 may also include terms or phrases that are indicators for bias writing style/tone, and the corresponding alternatives for the writing style/tone.

The profile adapting module 304, in one embodiment, modifies one or more bias terms of the user's profile information based on a job description for a job listing that the user is submitting their profile information for such that the user's profile information conforms to the job description. The profile adapting module 304, in certain embodiments, parses the user's profile information, e.g., using natural language processing or other information extraction techniques, to identify and flag bias terms/styles (e.g., similar to the job adapting module 204) that can be modified so that the user's profile information conforms or better matches the original job description of a job listing. In other words, while the job adapting module 204 modifies a job description to match a user's profile information, the profile adapting module 304 modifies a user's profile information to match the original job description for a job listing.

For example, the profile adapting module 304 may substitute or add terms to the user's resume that match or conform to terms in the job description of a job listing such as "challenging", "competitive", "demanding", "cooperative", etc., without changing the overall purpose or focus of the resume (e.g., without adding information that may be deceptive or false). The profile adapting module 304 may also remove bias terms from the user's profile information that do not conform to or appear in the original job description.

In one embodiment, the profile adapting module 304 modifies the user's profile information in response to the user submitting their profile information to apply for the job listing. In such an embodiment, the profile adapting module 304 modifies the user's profile on-the-fly, in real-time, dynamically, or the like in response to the user submitting their profile information to the job listing at the applicant interface 103. For example, if the user elects to apply for a job advertised in the job listing using their mobile phone, the profile adapting module 304 may modify the user's resume in response to the user submitting their resume to apply for the job. In this manner, the user's profile information is not modified for every job listing that is presented to the user, just the job listings that the user applies for.

In certain embodiments, the profile adapting module 304 modifies the user's profile information to conform to each job description of the plurality of job listings in response to receiving the plurality of job listings. In such an embodiment, the user's resume is pre-processed as the job listings are presented to the user, on a per-job listing basis, so that the user's resume is ready to submit when the user elects to apply for a job and does not require the profile adapting module 304 to modify the user's profile information dynamically on-the-fly.

In one embodiment, the confirmation module 306 prompts a user for confirmation to apply for a job prior to submitting the user's profile information for the job. In certain embodiments, the confirmation module 306 receives input from the user for applying to a job listing using the user's profile information, presents to the user an unmodified/original version of the job description for the job listing and a modified version of the user's profile information that conforms to the unmodified/original version of the job description (as modified by the profile adapting module 304), prompts the user for confirmation to apply for the job listing using the modified version of the user's profile information, and submits the user's modified profile information to the online job listing system for the job listing in response to receiving confirmation from the user to apply for the job listing. The prompt may be displayed as a pop-up window or as another graphical user element in the applicant interface 103.

In certain embodiments, the confirmation module 306 may present, as part of the confirmation prompt, an unmodified/original version of the job description for the job listing that the user is applying for, the modified version of the job description for the job listing, an unmodified/original version of the user's profile information, and a modified version of the user's profile information. In this manner, the user can see a comparison of each of the original and modified job descriptions and the corresponding profile information. Furthermore, the user may select which of the profile information to submit, e.g., the original/unmodified profile information, the modified profile information, or both. Thus, the confirmation module 306 provides a way for the user to review the modified profile information prior to submitting it for a job listing and allows the user to select whether to submit the modified profile information, the original profile information, or both.

In one embodiment, the profile receiving module 308 receives a plurality of modified user profiles at the online job listing system 101 and/or at the recruiter interface 105 for a job listing that is presented to a plurality of users. The profile receiving module 308, for example, may receive a plurality of modified resumes (and/or unmodified/original resumes) that are submitted by a plurality of applicants at the applicant interface 103. The plurality of user profiles may be received and stored at the data center/servers 110 for the online job system 101 and then forwarded or pushed to a recruiter/employer at the recruiter interface 105. In some embodiments, the profile receiving module 308 at the recruiter interface 105 polls the datacenter/servers 110 periodically for new profile information.

In certain embodiments, the profile ranking module 310 ranks each of the plurality of modified user profiles prior to presenting the user profiles to the recruiter, employer, or the like. Similar to the job ranking module 206, the profile ranking module 310 may utilize various ranking algorithms and relevancy scores, factors, weights, or the like to determine a ranking of the modified and/or original users' profile information. For instance, the profile ranking module 310 may rank the users' profile information according to skill, education, competency, experience, or the like, as determined based on the recruiter's preferences (e.g., favoring experience over education).

In one embodiment, the profile adapting module 304 at the recruiter interface 105 further modifies or adjusts the received user profile information to conform to one or more preferences that the recruiter/employer defines prior to presenting the user profile information to the recruiter/employer. For instance, when a modified resume is received, the profile adapting module 304 may compare the portions of the resume that were modified at the applicant interface 103 (e.g., using the flags/markers in the markup language representing the resume) with the recruiter/employer preferences to determine whether to change the modifications, retain the modifications, remove the modifications, revert the modifications, and/or the like. In this manner, each of the user's profile information that is received can be "equalized" according to the bias specifications, preferences, or the like of the user/recruiter/employer associated with the job listing.

In one embodiment, the profile presentation module 312 presents each of the plurality of modified user profiles for the job listing to the user associated with the job listing (e.g., the recruiter, company, employer, or the like) in order of the rank for each of the modified user profiles. The modified user profiles may be presented with the unmodified/original versions of the user profiles. In some embodiments, the user profile information is presented in a web browser, mobile application, desktop application, and/or the like. The profile presentation module 312 may further display markers where certain terms, phrases, styles, or the like were changed to remove/correct biases. A user may then click or select the marker to see the original (e.g., as a pop-up, overlay, tooltip, or the like).

Figure 4:
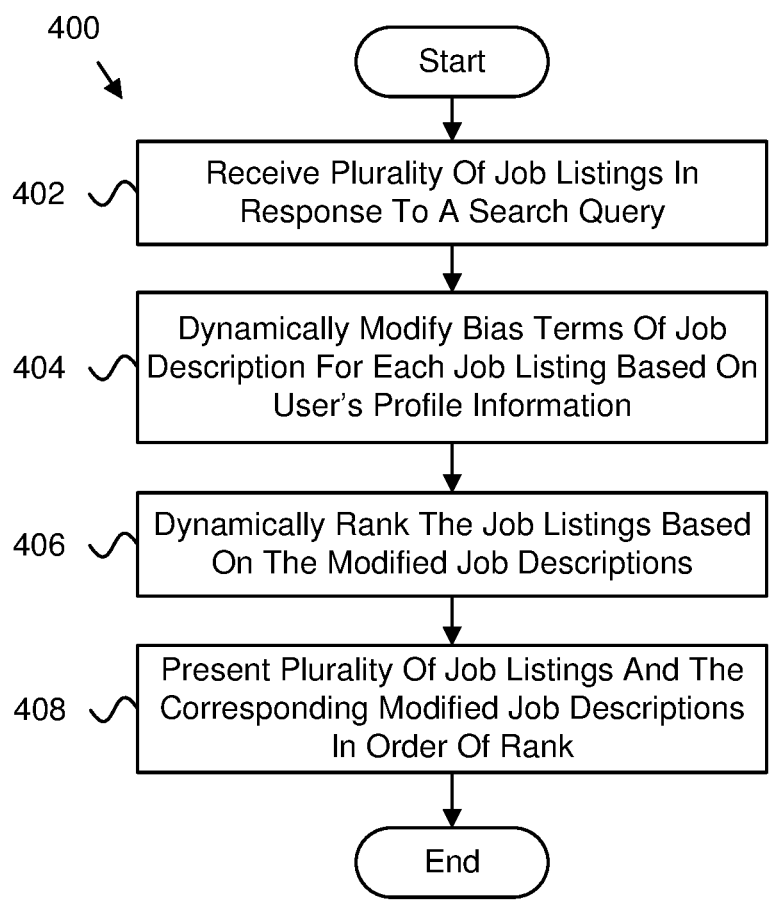
FIG. 4 is a schematic flow chart diagram illustrating one embodiment of a method for dynamically debiasing an online job application system.

FIG. 4 is a schematic flow chart diagram illustrating one embodiment of a method 400 for dynamically debiasing an online job application system. In one embodiment, the method 400 begins and receives 402 a plurality of job listings in response to a search query on an online job listing system 101. In some embodiments, each of the plurality of job listings includes a job description. In certain embodiments, the method 400 dynamically modifies 404 one or more bias terms of the job description for each of the plurality of job listings based on profile information for a user such that each of the job descriptions conforms to the user's profile information.

In certain embodiments, the method 400 dynamically ranks 406 each of the plurality of job listings based on the modified job descriptions and with respect to the user's profile information and the search query. In further embodiments, the method 400 presents 408 the plurality of job listings and their corresponding modified job descriptions in order of the rank for each of the plurality of job listings, and the method 400 ends. In one embodiment, the job receiving module 202, the job adapting module 204, the job ranking module 206, and the job presentation module 208 perform the various steps of the method 400.

Figure 5:
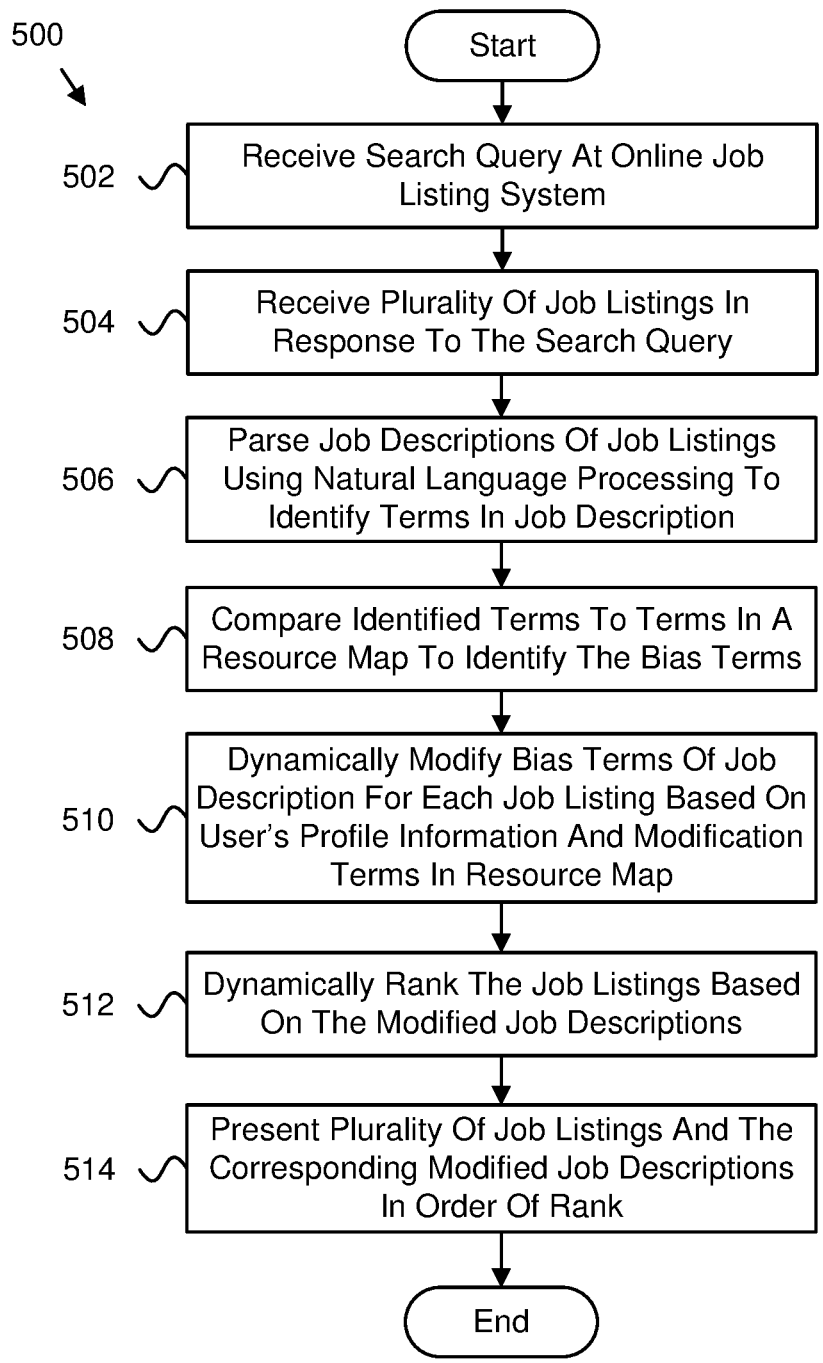
FIG. 5 is a schematic flow chart diagram illustrating one embodiment of another method for dynamically debiasing an online job application system.

FIG. 5 is a schematic flow chart diagram illustrating one embodiment of another method 500 for dynamically debiasing an online job application system. In one embodiment, the method 500 begins and receives 502 a search query for a plurality of job listings at an online job listing system 101. The search query may include one or more keywords, filters (e.g., salary range, job location, or the like). The method 500, in further embodiments, receives 504 a plurality of job listings in response to the search query. Each of the job listings may include a job description.

In certain embodiments, the method 500 parses 506 each of the job descriptions for the job listings using natural language processing to identify each term of the job description. The method 500, in certain embodiments, compares 508 the identified terms of the job description to terms in a resource map to identify bias terms and their corresponding alternatives. The method 500 dynamically, in some embodiments, modifies 510 one or more bias terms of the job description for each of the plurality of job listings based on profile information for a user using the bias terms identified in the resource map.

The method 500, in one embodiment, dynamically ranks 512 each of the plurality of job listings based on the modified job descriptions and with respect to the user's profile information and the search query. The method 500, in further embodiments, presents 514 the plurality of job listings and their corresponding modified job descriptions in order of the rank for each of the plurality of job listings, and the method 500 ends. In certain embodiments, the job receiving module 202, the job adapting module 204, the job ranking module 206, the job presentation module 208, and the term module 302 perform the various steps of the method 500.

Figure 6:
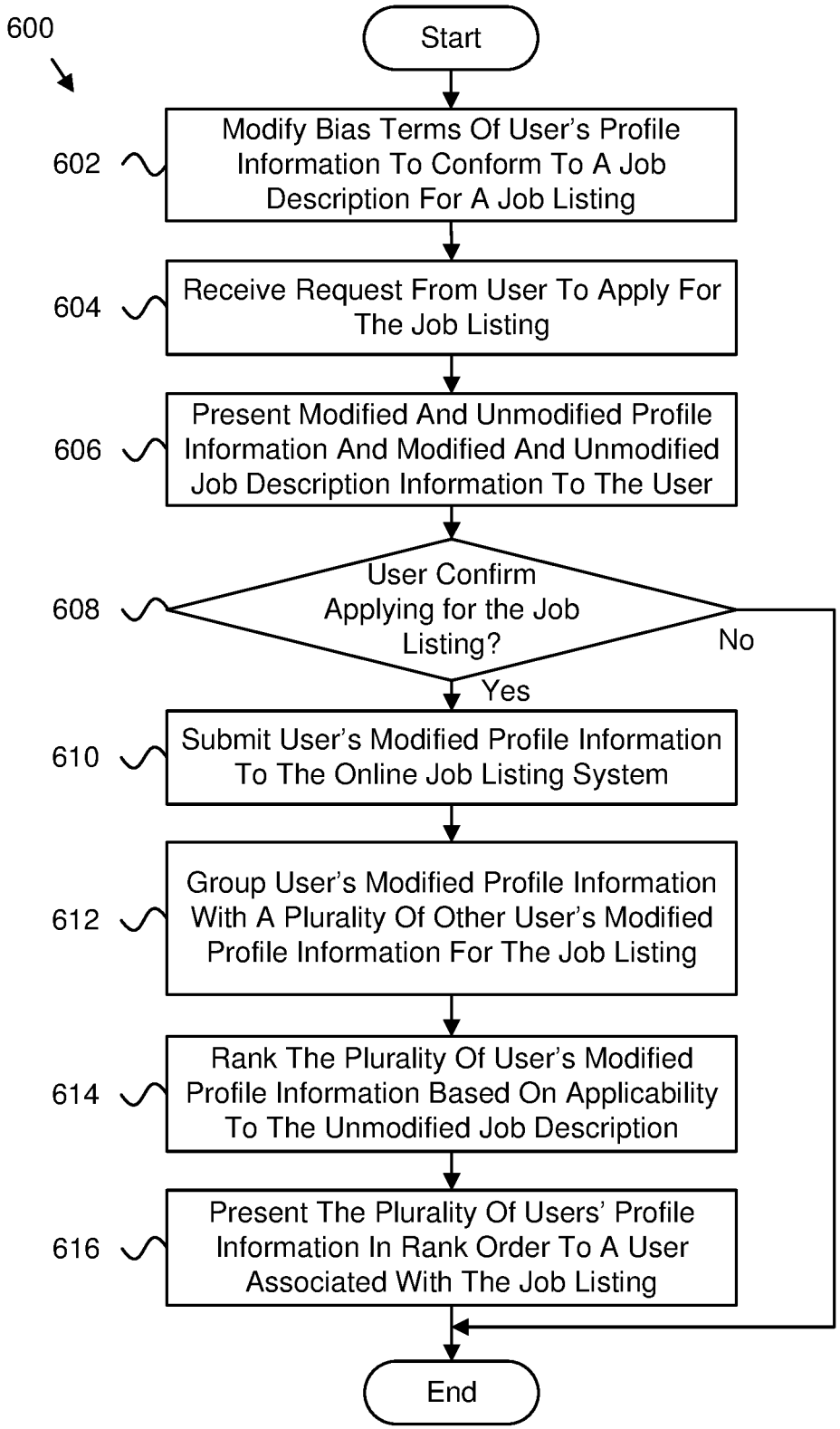
FIG. 6 is a schematic flow chart diagram illustrating one embodiment of yet another method for dynamically debiasing an online job application system.

FIG. 6 is a schematic flow chart diagram illustrating one embodiment of yet another method 600 for dynamically debiasing an online job application system. In one embodiment, the method 600 begins and modifies 602 one or more bias terms of the user's profile information based on a job description for a job listing that the user is submitting their profile information for such that the user's profile information conforms to the job description. The method 600, in some embodiments, receives 604 a request from the user/applicant to apply a job listing. The method 600, in certain embodiments, presents 606 modifies and unmodified/original versions of the user's profile information and modified and unmodified/original versions of the job description to the user.

The method 600, in certain embodiments, determines 608 whether the user confirmed submission of the modified version of the user's profile to apply for the job. If not, the method 600 ends. Otherwise, the method 600, in some embodiments, submits 610 the user's modified profile information to the online job listing system 101. In further embodiments, the method 600 groups 612 or combines the user's modified profile information with other users' modified profile information that has been submitted for applying to the job listing.

In some embodiments, the method 600 ranks 614 each of the plurality of modified user profiles based on the applicability or relevance of the modified user profiles to the unmodified/original job descriptions. The method 600, in some embodiments, presents 616 the plurality of users' profile information in ranking order to the user associated with the job listing (e.g., the recruiter, the employer, the company, or the like), and the method 600 ends. In some embodiments, the profile adapting module 304, the confirmation module 306, the profile receiving module 308, the profile ranking module 310, and the profile presentation module 312 perform the various steps of the method 600.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a processor;
a memory that stores code executable by the processor to:
receive a plurality of job listings in response to a search query on an online job listing system, each of the plurality of job listings comprising a job description;
dynamically modify one or more bias terms of the job description for each of the plurality of job listings based on profile information for a user by removing bias terms from the job descriptions and including terms in the job descriptions that correspond to the user's profile information;
dynamically rank each of the plurality of job listings based on the modified job descriptions and with respect to the user's profile information and the search query; and
present the plurality of job listings and their corresponding modified job descriptions in order of the rank for each of the plurality of job listings.

2. The apparatus of claim 1, wherein dynamically modifying the one or more bias terms of a job description comprises one or more of substituting different terms for the bias terms, and adding additional terms to the job description.

3. The apparatus of claim 1, further comprising code executable by the processor to parse each of the job descriptions using natural language processing to identify and modify the bias terms for each of the job descriptions.

4. The apparatus of claim 1, further comprising code executable by the processor to compare each term of the job description against terms in a resource map to identify the one or more bias terms, the resource map comprising a plurality of predefined bias terms and their corresponding modifications.

5. The apparatus of claim 1, further comprising code executable by the processor to modify one or more bias terms of the user's profile information based on a job description for a job listing that the user is submitting their profile information for such that the user's profile information conforms to the job description.

6. The apparatus of claim 5, wherein modifying the user's profile information is in response to the user submitting their profile information to apply for the job listing.

7. The apparatus of claim 5, wherein modifying the user's profile information to conform to each job description of the plurality of job listings is in response to receiving the plurality of job listings.

8. The apparatus of claim 1, further comprising code executable by the processor to:
   receive input from the user for applying to a job listing using the user's profile information;
   present to the user an unmodified version of the job description for the job listing and a modified version of the user's profile information that conforms to the unmodified version of the job description;
   prompt the user for confirmation to apply for the job listing using the modified version of the user's profile information; and
   submit the user's modified profile information to the online job listing system for the job listing in response to receiving confirmation from the user to apply for the job listing.

9. The apparatus of claim 8, further comprising code executable by the processor to submit the user's unmodified profile information in response to receiving confirmation from the user to apply for the job listing.

10. The apparatus of claim 8, further comprising code executable by the processor to present an unmodified version of the job description for the job listing, the modified version of the job description for the job listing, an unmodified version of the user's profile information, and a modified version of the user's profile information as part of prompting the user for confirmation to apply for the job listing.

11. The apparatus of claim 1, further comprising code executable by the processor to:
   receive a plurality of modified user profiles at the online job listing system for a job listing that is presented to a plurality of users;
   rank each of the plurality of modified user profiles; and
   present each of the plurality of modified user profiles for the job listing to a user associated with the job listing, the plurality of modified user profiles presented in order of the rank for each of the modified user profiles.

12. The apparatus of claim 11, wherein each of the plurality of modified user profiles are further modified according to one or more bias and style specifications defined by the user associated with the job listing.

13. The apparatus of claim 1, wherein the user's profile information comprises one or more of a resume, a curriculum vitae, and an online profile for the user.

14. The apparatus of claim 1, wherein the one or more bias terms comprise terms associated with a class of people designated as protected by a government, the bias terms comprising terms related to one or more of sex, race, age, religion, ethnicity, and physical or mental disability.

15. A method comprising:
   receiving a plurality of job listings in response to a search query on an online job listing system, each of the plurality of job listings comprising a job description;
   dynamically modifying one or more bias terms of the job description for each of the plurality of job listings based on profile information for a user by removing bias terms from the job descriptions and including terms in the job descriptions that correspond to to the user's profile information;
   dynamically ranking each of the plurality of job listings based on the modified job descriptions and with respect to the user's profile information and the search query; and
   presenting the plurality of job listings and their corresponding modified job descriptions in order of the rank for each of the plurality of job listings.

16. The method of claim 15, wherein dynamically modifying the one or more bias terms of a job description comprises one or more of substituting different terms for the bias terms, and adding additional terms to the job description.

17. The method of claim 15, further comprising parsing each of the job descriptions using natural language processing to identify and modify the bias terms for each of the job descriptions.

18. The method of claim 15, further comprising comparing each term of the job description against terms in a resource map to identify the one or more bias terms, the resource map comprising a plurality of predefined bias terms and their corresponding modifications.

19. The method of claim 15, further comprising modifying one or more bias terms of the user's profile information based on a job description for a job listing that the user is submitting their profile information for such that the user's profile information conforms to the job description.

20. A computer program product comprising a computer readable storage medium having program instructions embodied therewith, the program instructions executable by a processor to cause the processor to:
   receive, by processor, a plurality of job listings in response to a search query on an online job listing system, each of the plurality of job listings comprising a job description;
   dynamically modify, by processor, one or more bias terms of the job description for each of the plurality of job listings based on profile information for a user by removing bias terms from the job descriptions and including terms in the job descriptions that correspond to to the user's profile information;
   dynamically rank, by processor, each of the plurality of job listings based on the modified job descriptions and with respect to the user's profile information and the search query; and
   present, by processor, the plurality of job listings and their corresponding modified job descriptions in order of the rank for each of the plurality of job listings.

* * * * *